United States Patent
Amir et al.

(10) Patent No.: US 12,287,479 B2
(45) Date of Patent: Apr. 29, 2025

(54) DIRECT VIEW DISPLAY WITH TRANSPARENT VARIABLE OPTICAL POWER ELEMENTS

(71) Applicant: Elbit Systems Ltd., Haifa (IL)

(72) Inventors: Ornit Amir, Haifa (IL); Yolanda Landesberg, Haifa (IL); Aron Arlievsky, Haifa (IL); Ofer Nesher, Haifa (IL)

(73) Assignee: Elbit Systems Ltd., Haifa (IL)

( * ) Notice: Subject to any disclaimer, the term of this patent is extended or adjusted under 35 U.S.C. 154(b) by 746 days.

(21) Appl. No.: 17/359,650

(22) Filed: Jun. 28, 2021

(65) Prior Publication Data
US 2021/0325674 A1    Oct. 21, 2021

Related U.S. Application Data

(63) Continuation of application No. PCT/IL2019/051442, filed on Dec. 31, 2019.

(30) Foreign Application Priority Data

Dec. 31, 2018  (IL) ............................ 264045

(51) Int. Cl.
G02B 27/01    (2006.01)
G02B 27/00    (2006.01)
G02B 30/34    (2020.01)

(52) U.S. Cl.
CPC ..... *G02B 27/0101* (2013.01); *G02B 27/0093* (2013.01); *G02B 30/34* (2020.01);
(Continued)

(58) Field of Classification Search
CPC .. G02B 27/0101; G02B 27/093; G02B 30/34; G02B 2027/0134; G02B 2027/014; G02B 2027/0185
(Continued)

(56) References Cited

U.S. PATENT DOCUMENTS

2015/0378074 A1    12/2015    Kollin et al.
2016/0025978 A1    1/2016    Mallinson
(Continued)

FOREIGN PATENT DOCUMENTS

CN    203535311    4/2014
CN    204331143    5/2015
(Continued)

OTHER PUBLICATIONS

International Search Report and Written Opinion for PCT Application No. PCT/IL2019/051442, mailed Apr. 21, 2020.

*Primary Examiner* — Wyatt A Stoffa
*Assistant Examiner* — Grant A Gagnon
(74) *Attorney, Agent, or Firm* — PEARL COHEN ZEDEK LATZER BARATZ LLP

(57) ABSTRACT

A direct view display system (DVDS) and a method to operate it are provided herein. The DVDS may include: a variable optical power element (VOPE); a transparent active image source located with the VOPE on a common optical axis going from an outside scene to an eye position of a viewer; and a time division multiplexer (TDM) configured to control the VOPE and the transparent active image source, wherein the TDM is configured in a certain time period to cause the transparent active image source to be in a transparent state and the VOPE to exhibit no optical power, and wherein the TDM is configured in another time period to cause said transparent active image source to exhibit an image and said VOPE to apply non-zero optical power, for projecting the image onto the eye position at a desirable distance therefrom.

12 Claims, 8 Drawing Sheets

(52) U.S. Cl.
CPC ............... *G02B 2027/0134* (2013.01); *G02B 2027/014* (2013.01); *G02B 2027/0185* (2013.01)

(58) Field of Classification Search
USPC ........................................................ 359/630
See application file for complete search history.

(56) References Cited

U.S. PATENT DOCUMENTS

| | | |
|---|---|---|
| 2016/0131918 A1 | 5/2016 | Chu et al. |
| 2016/0147067 A1 | 5/2016 | Hua et al. |
| 2017/0293260 A1 | 10/2017 | Chuang et al. |
| 2017/0301313 A1 | 10/2017 | Perreault |
| 2018/0146183 A1 | 5/2018 | Zhou |

FOREIGN PATENT DOCUMENTS

| | | |
|---|---|---|
| EP | 2447757 | 5/2012 |
| WO | WO 2014/197109 | 12/2014 |

DIRECT VIEW DISPLAY WITH TRANSPARENT VARIABLE OPTICAL POWER ELEMENTS

CROSS-REFERENCE TO RELATED APPLICATIONS

This Application is a continuation of PCT Application No. PCT/IL2019/051442, filed on Dec. 31, 2019, which claims priority from Israeli Patent Application No. 264045 filed on Dec. 31, 2018, both are incorporated herein by reference in their entireties.

FIELD OF THE INVENTION

The present invention relates generally to the field of see-through and direct view display systems.

BACKGROUND OF THE INVENTION

Prior to setting forth the background of the invention, it may be helpful to set forth definitions of certain terms that will be used hereinafter.

A "see-through display" or a "see-through display system" (STDS) as used herein is defined as an electronic display that allows the user (e.g., viewer) to see what is shown on the screen (e.g. glass screen) while still being able to see through it. These screens may be used for augmented reality (AR), a way of enhancing the view of the world with digital images (e.g. synthetic images) overlaid onto real ones, and other applications such as shopping displays and more sophisticated computer screens.

An "active image source" as used herein is any device that actively produces an image on a transparent screen, possibly responsive to some incoming data stream. The "active image source" can be, for example, a transparent organic light emitting diode (OLED) or a transparent liquid crystal display (LCD) or a projector combined with a transparent fluorescent or phosphorus screen.

A "direct view display system" or a "direct view display" as used herein is defined as an electronic display in which the synthetic image is generated (possibly by an active image source) along the optical axis going from the scene to the eye of the viewer. This type of display called "direct" since the image is produced and viewed directly from the source of the image and it is not being reflected or folded from an image source located outside the optical axis running from the scene to the viewer.

A "variable optical power element" or "VOPE" as used herein is a material that changes its optical power (e.g. focal length) in response to a stimulus signal such as electricity. The VOPE can be made of, by way of example, an electricity reactive lens and may be implemented in many ways and is not limited herein to one implementation.

The main challenge with see-through displays is making sure that both the outside scene and the synthetic image are viewed in optimal conditions for the viewer in terms of the focal plane in which the outside scene and the synthetic image are presented. While the outside scene is in infinity, the synthetic image is located on a focal plan positioned between a few centimeters (in a case of a near eye display) and tens of centimeters (in a case of a head up display).

SUMMARY OF THE INVENTION

Some embodiments of the present invention provide a see-through display system (STDS) which is also a direct view display. The STDS includes a variable optical power element (VOPE); a transparent active image source located together with the VOPE on a common optical axis going from an outside scene to an eye position of a viewer; and a time division multiplexer (TDM) configured to control the VOPE and the transparent active image source, wherein the TDM is configured in a certain time period to cause the transparent active image source to be in a transparent state and the VOPE to exhibit no optical power, and wherein the TDM is configured in another time period to cause said transparent active image source to exhibit an image and said VOPE to apply non-zero optical power, for projecting the image onto the eye position at a desirable distance therefrom.

Some embodiments of the present invention provide a method for controlling a see-through display which includes a variable optical power element (VOPE) and a transparent active image source located with said VOPE on a common optical axis going from a scene to an eye position of a viewer. The method may include the following steps: controlling said VOPE and the transparent active image source at a time division multiplexing (TDM) pattern, wherein said TDM pattern causes in a certain time period the transparent active image source to be in a transparent state and said VOPE to exhibit no optical power, and wherein said TDM pattern causes in another time period the transparent active image source to exhibit an image and said VOPE to apply non-zero optical power, for projecting the image onto the eye position at a desirable distance therefrom.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
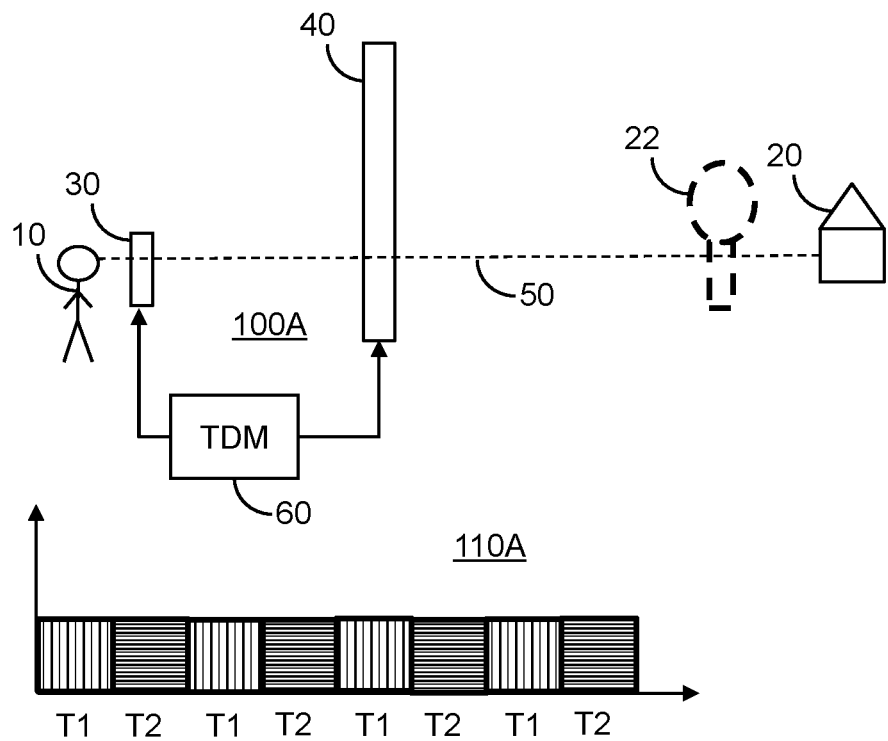
FIG. 1A shows a block diagram and a respective timing diagram illustrating a non-limiting exemplary architecture of a see-through display system (STDS) in a head up display (HUD) configuration and its functionality in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing" "computing" "calculating" "determining" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1A is a block diagram illustrating non-limiting exemplary architecture of see-through display system (STDS) 100A in a direct view head up display (HUD) configuration in accordance with embodiments of the present invention. The STDS may include a variable optical power element (VOPE) 30 and a transparent active image source 40 located with VOPE 30 on a common optical axis 50 going from an outside scene 20 to an eye position of a viewer 10. STDS 100A may further include a time division multiplexer (TDM) 60 configured to control VOPE 30 and transparent active image source 40, by alternating between feeding VOPE 30 and transparent active image source 40 with respective power sources and/or data sources (power and data sources are not shown here for simplicity).

In accordance with some embodiments of the present invention, TDM 60 may be configured in a certain time period T1 in time diagram 110A to cause transparent active image source 40 to be in a transparent state and VOPE 30 to exhibit no optical power. TDM 60 may be further configured in another time period T2 to cause transparent active image source 40 to exhibit an image 22 and VOPE 30 to apply non-zero optical power, for projecting image 22 onto the eye position of user 10 at a desirable distance therefrom.

Figure 1B:
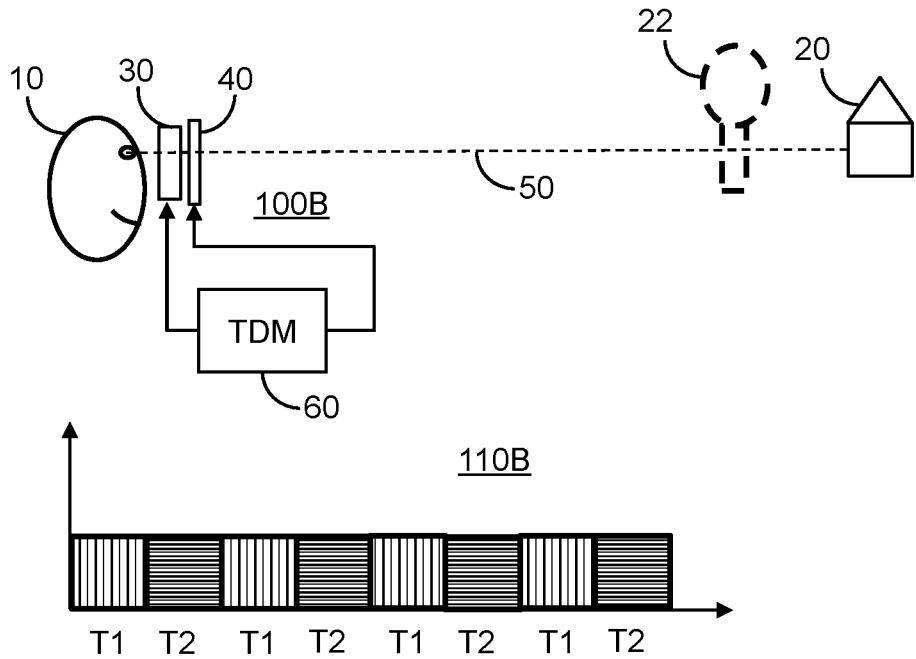
FIG. 1B shows a block diagram and a respective timing diagram illustrating a non-limiting exemplary architecture of a see-through display system (STDS) in a head mounted display (HMD) configuration and its functionality in accordance with some embodiments of the present invention.

FIG. 1B is a block diagram illustrating non-limiting exemplary architecture of see-through display system (STDS) 100B in a direct view head mounted display (HMD) configuration in accordance with embodiments of the present invention. The STDS may include a variable optical power element (VOPE) 30 and a transparent active image source 40 located with VOPE 30 on a common optical axis 50 going from an outside scene 20 to an eye position of a viewer 10. STDS 100A may further include a time division multiplexer (TDM) 60 configured to control VOPE 30 and transparent active image source 40, by alternating between feeding VOPE 30 and transparent active image source 40 with respective power sources and/or data sources (power and data sources are not shown here for simplicity).

In accordance with some embodiments of the present invention, TDM 60 may be configured in a certain time period T1 in time diagram 110B to cause transparent active image source 40 to be in a transparent state and VOPE 30 to exhibit no optical power. TDM 60 may be further configured in another time period T2 to cause transparent active image source 40 to exhibit an image 22 and VOPE 30 to apply non-zero optical power, for projecting image 22 onto the eye position of user 10 at a desirable distance therefrom.

In accordance with some embodiments of the present invention, VOPE 30 may have optical arrangement (not shown) coupled thereto or located along optical axis 50. The optical arrangement can be used to increase the range of the diopter controlled by the VOPE and alternatively or additionally may compensate optical aberrations. The optical arrangement may be either static or dynamic.

Figure 2:
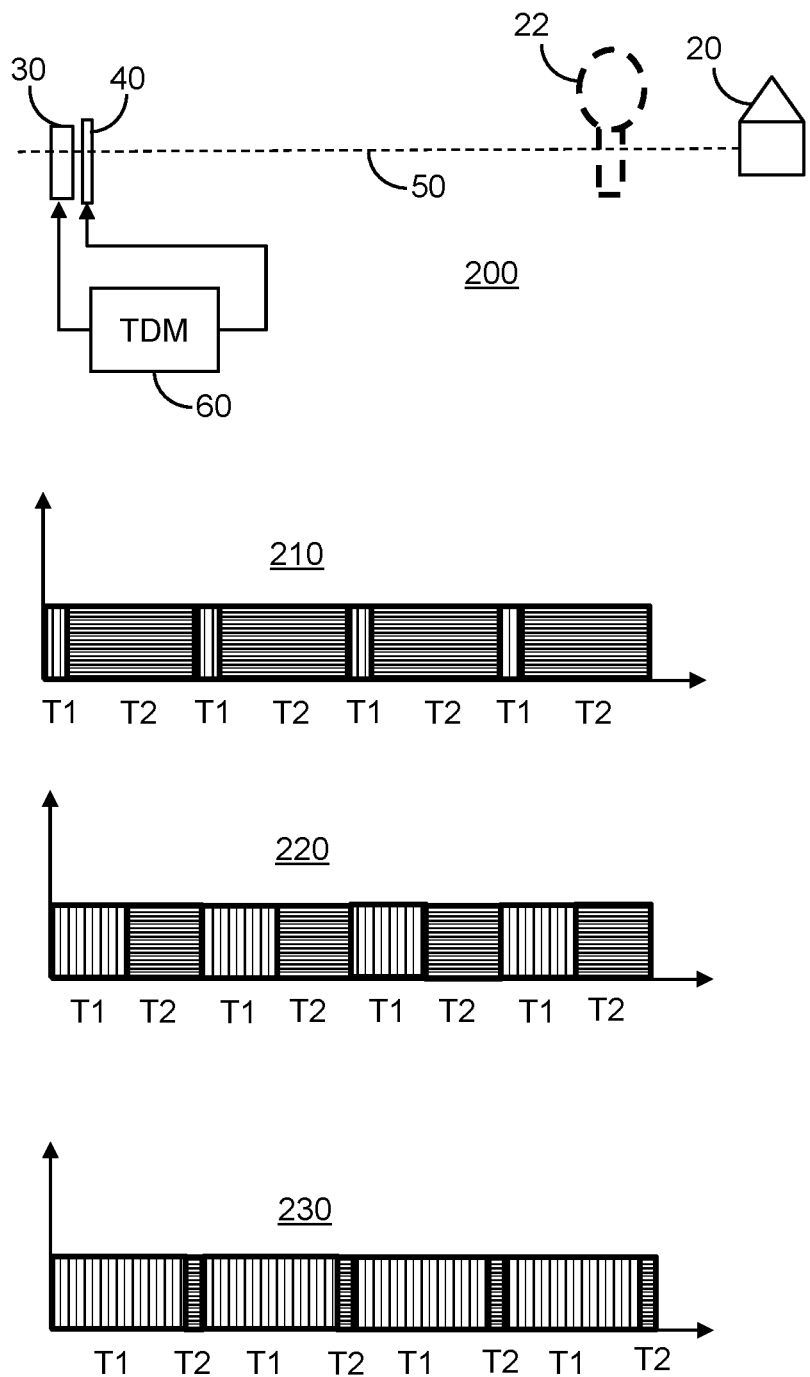
FIG. 2 shows a block diagram illustrating a non-limiting exemplary architecture of an STDS in either HMD or HUD configuration with respective timing diagrams in accordance with some embodiments of the present invention.

FIG. 2 shows a block diagram illustrating a non-limiting exemplary architecture of an STDS in either HMD or HUD configuration with respective timing diagrams in accordance with some embodiments of the present invention. As in FIGS. 1A and 1B, TDM 60 of STDS 200 may be configured in a certain time period T1 in time diagram 210 to cause transparent active image source 40 to be in a transparent state and VOPE 30 to exhibit no optical power. TDM 60 may be further configured in another time period T2 of time diagram 210 to cause transparent active image source 40 to exhibit an image 22 and VOPE 30 to apply non-zero optical power, for projecting image 22 onto the eye position of user 10 at a desirable distance therefrom. As can be seen in further time diagrams 220 and 230 the ratio of T1/T2 may be changed in order to achieve a desirable blend between the luminance or intensity of the scene 20 versus the luminance/intensity of the synthetic image 22 presented to the viewer. It will be desirable, for example, to increase the intensity of synthetic image 22 where scene 20 is very bright.

Figure 3:
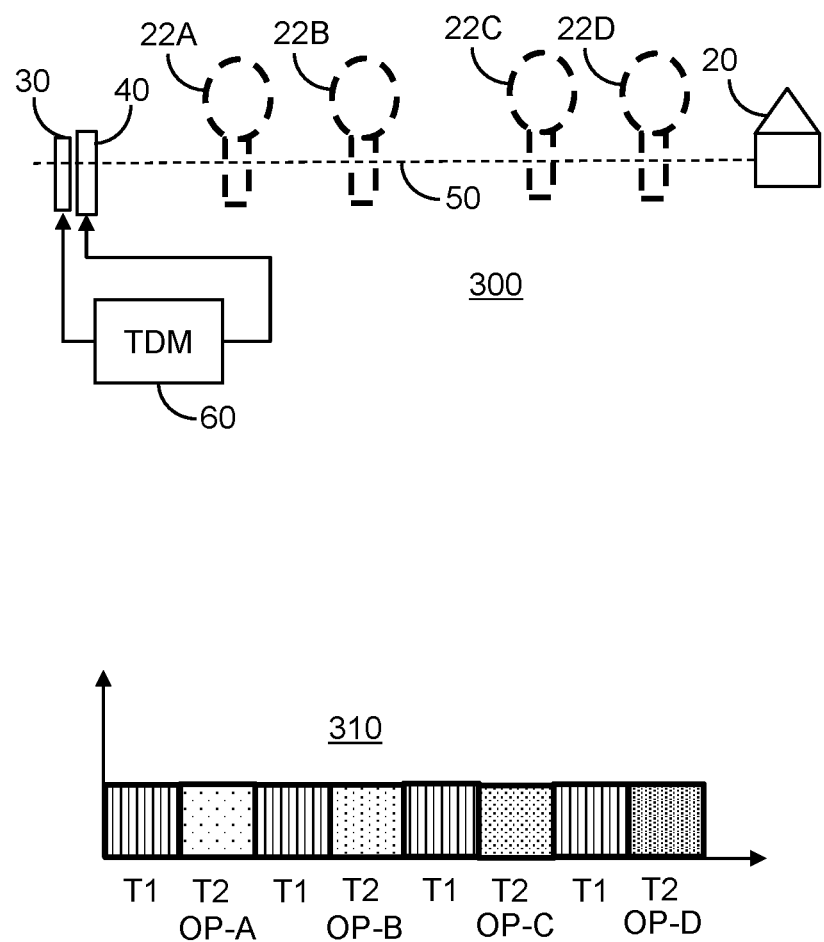
FIG. 3 shows a block diagram illustrating a non-limiting exemplary architecture of an STDS in either HMD or HUD configuration with a respective timing diagram in accordance with some embodiments of the present invention.

FIG. 3 shows a block diagram illustrating a non-limiting exemplary architecture of an STDS 300 in either HMD or HUD configuration with a respective timing diagram 310 in accordance with some embodiments of the present invention. Here, TDM 60 may be configured to control VOPE 30 with a different optical power in respective T2 periods in time diagram 310 so that for each optical power (OP-A, OP-B, OP-C, and OP-D) a respective image generated by transparent active image source 40 shall be presented (22A, 22B, 22C, and 22D) respectively over time so that the viewer may be presented with a moving image over time along optical axis 50.

Figure 4:
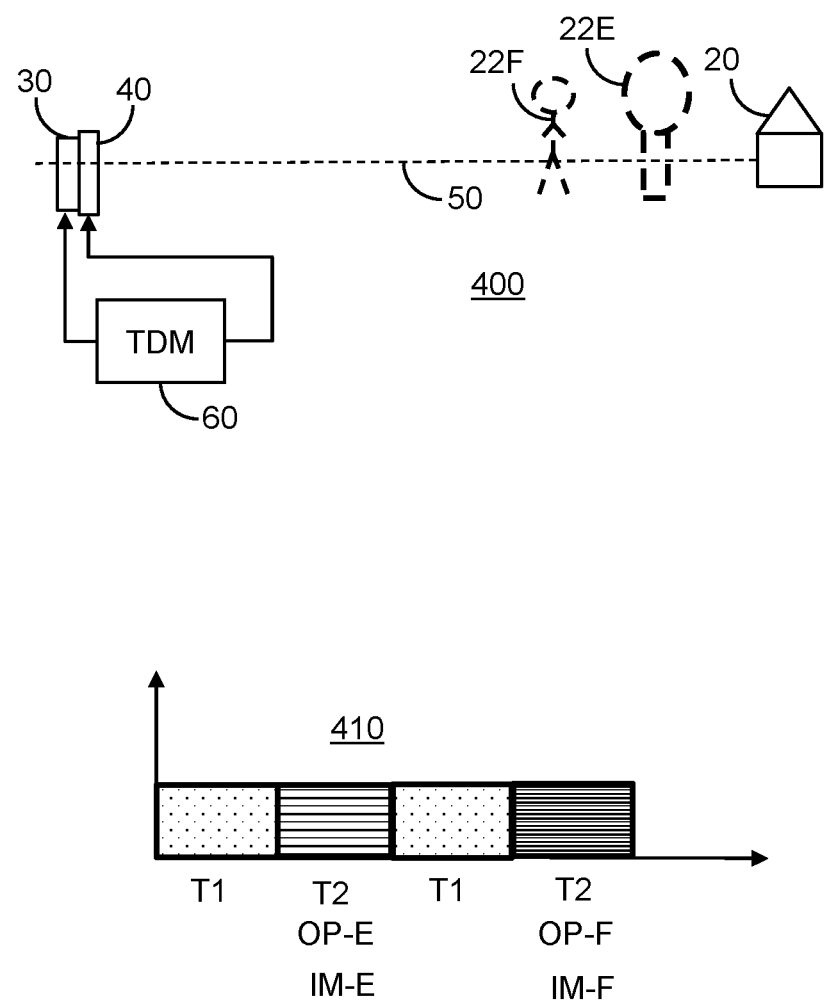
FIG. 4 shows a block diagram illustrating a non-limiting exemplary architecture of an STDS in either HMD or HUD configuration with a respective timing diagram in accordance with some embodiments of the present invention.

FIG. 4 shows a block diagram illustrating a non-limiting exemplary architecture of an STDS 400 in either HMD or HUD configuration with a respective timing diagram 410 in accordance with some embodiments of the present invention. Here, transparent active image source 40 may be configured to generate at least two different images (22E and 22F). TDM 60 may be configured to control in period T2 in time diagram 410 VOPE 30 with respective optical power (OP-E and OP-F) so as the images data IM-E and IM-F will be presented as two different images 22E and 22F in two different locations along the optical axis 50.

Figure 5:
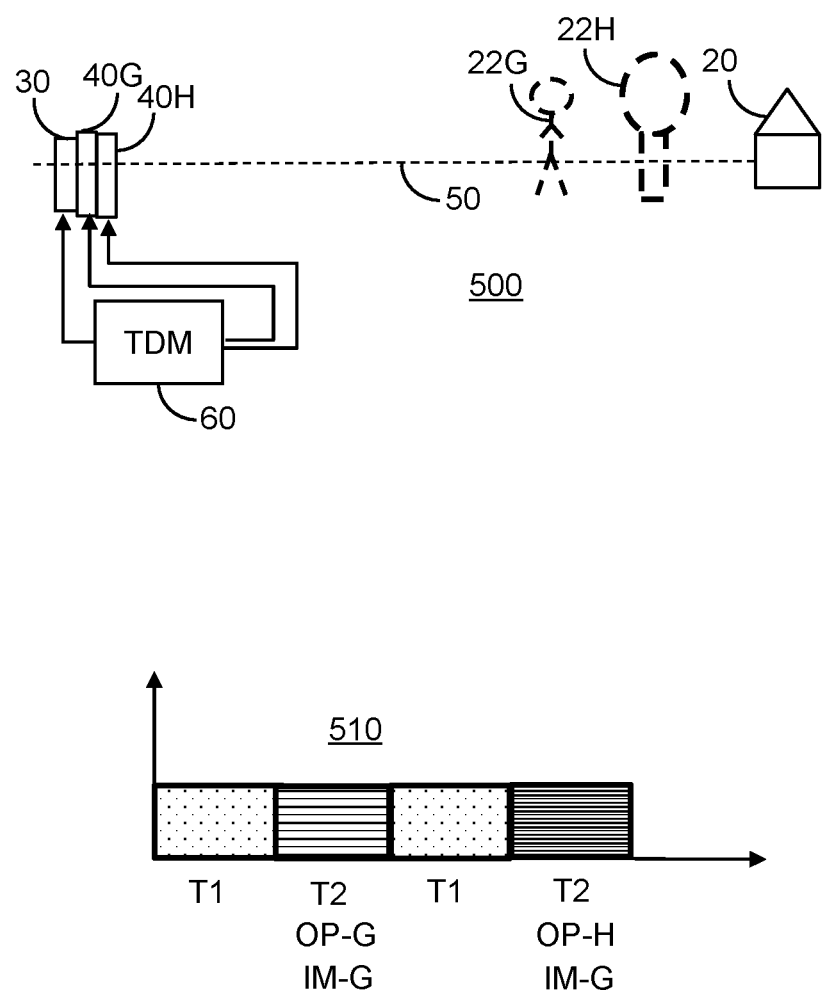
FIG. 5 shows a block diagram illustrating a non-limiting exemplary architecture of an STDS in either HMD or HUD configuration with a respective timing diagram in accordance with some embodiments of the present invention.

FIG. 5 shows a block diagram illustrating a non-limiting exemplary architecture of an STDS 500 in either HMD or HUD configuration with a respective timing diagram 510 in accordance with some embodiments of the present invention. Here, two or more transparent active image sources (40G and 40H) are used and may be configured to generate at least two different images (22G and 22H). TDM 60 may be configured to control in period T2 in time diagram 510 VOPE 30 with respective optical power (OP-G and OP-H) so as the images data IM-G and IM-H will be generated respective transparent active image sources 40G and 40H and by presented to the viewer as two different images 22G and 22H in two different locations along the optical axis 50.

Figure 6:
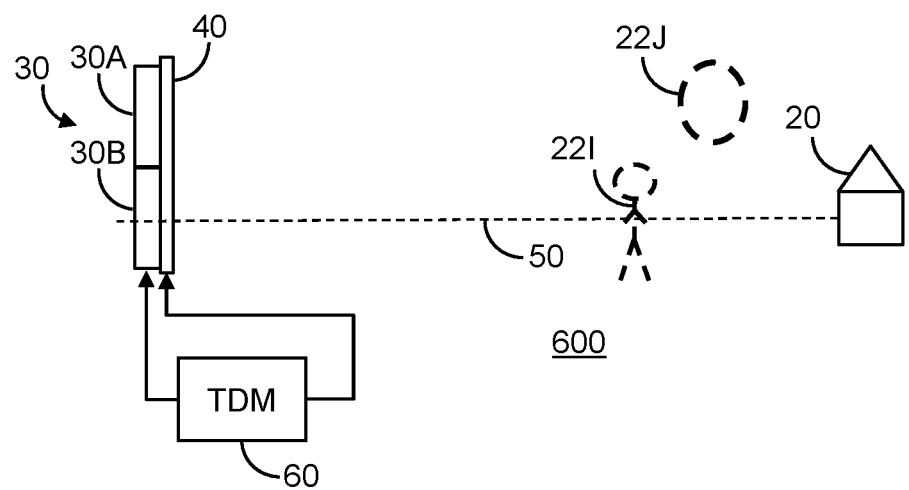
FIG. 6 shows a block diagram illustrating a non-limiting exemplary architecture of an STDS in either HMD or HUD configuration with a respective timing diagram in accordance with some embodiments of the present invention.
Figure 6:
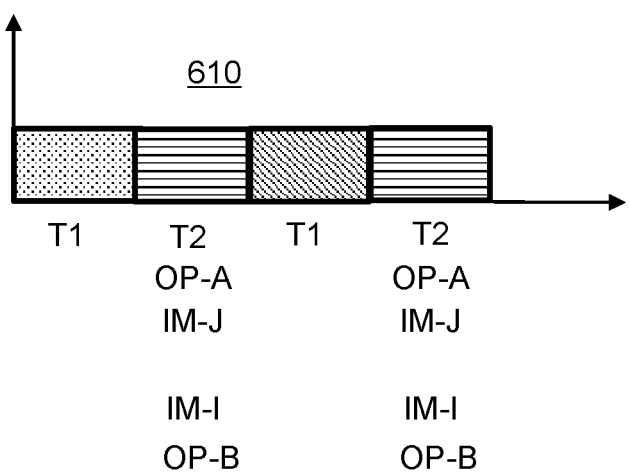

FIG. 6 shows a block diagram illustrating a non-limiting exemplary architecture of an STDS 600 in either HMD or HUD configuration with a respective timing diagram 610 in accordance with some embodiments of the present invention. Here VOPE 30 has an array of optical elements that enable two or more regions (30A and 30B) of VOPE 30 to exhibit simultaneously a different optical power and so two or more synthetic images 22I and 22J can be presented in two or more distances. TDM 60 may be configured at time period T2 of time diagram 610 to control VOPE portion 30A with optical power OP-A projecting image data IM-J to produce image 22J and at the same time (T2) to control VOPE portion 30B with optical power OP-B projecting image data IM-I to produce image 22I.

Figure 7:
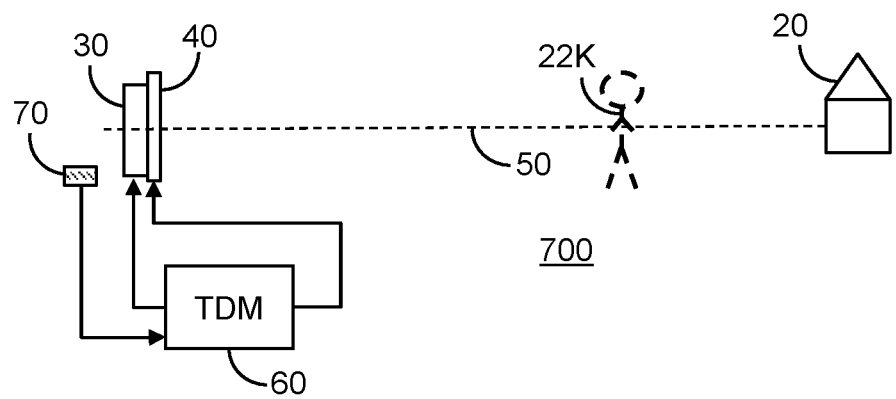
FIG. 7 shows a block diagram illustrating a non-limiting exemplary architecture of an STDS in either HMD or HUD configuration with a respective timing diagram in accordance with some embodiments of the present invention.
Figure 7:
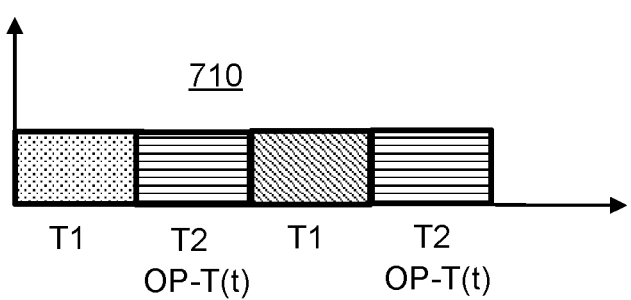

FIG. 7 shows a block diagram illustrating a non-limiting exemplary architecture of an STDS 700 in either HMD or HUD configuration with a respective timing diagram 710 in accordance with some embodiments of the present invention. Here temperature sensor 70 is added to the architecture and configured to sense the temperature of STDS 700. TDM 60 is configured in T2 of time diagram 710, to control VOPE 30 in an optical power level OP-T(t) that is a selected to compensate the change to the optics of TDS 700 due to temperature. The exact value of optical power level OP-T(t) may be obtained from a look up table (LUT) that is pre-generated in a calibration process.

It is understood that any of architectures 100A, 100B, 200, 300, 400, 500, 600, and 700 discussed herein as well as other possible architectures implementing embodiments of the present invention may be duplicated and provided for each eye of the viewer separately. In this manner every eye receives the images from the active image source in the desirable viewpoint and angle so that a stereoscopic synthetic image superimposed on the scene is created in the brain of the viewer.

It is also understood that several VOPE units may be used in a form of two-dimensional array so as to cover a wider field of view. The array of VOPE units is specifically needed for HUD embodiments where the size of the see-through display is large and so several VOPE units are needed to cover larger portion of the HUD.

Figure 8:
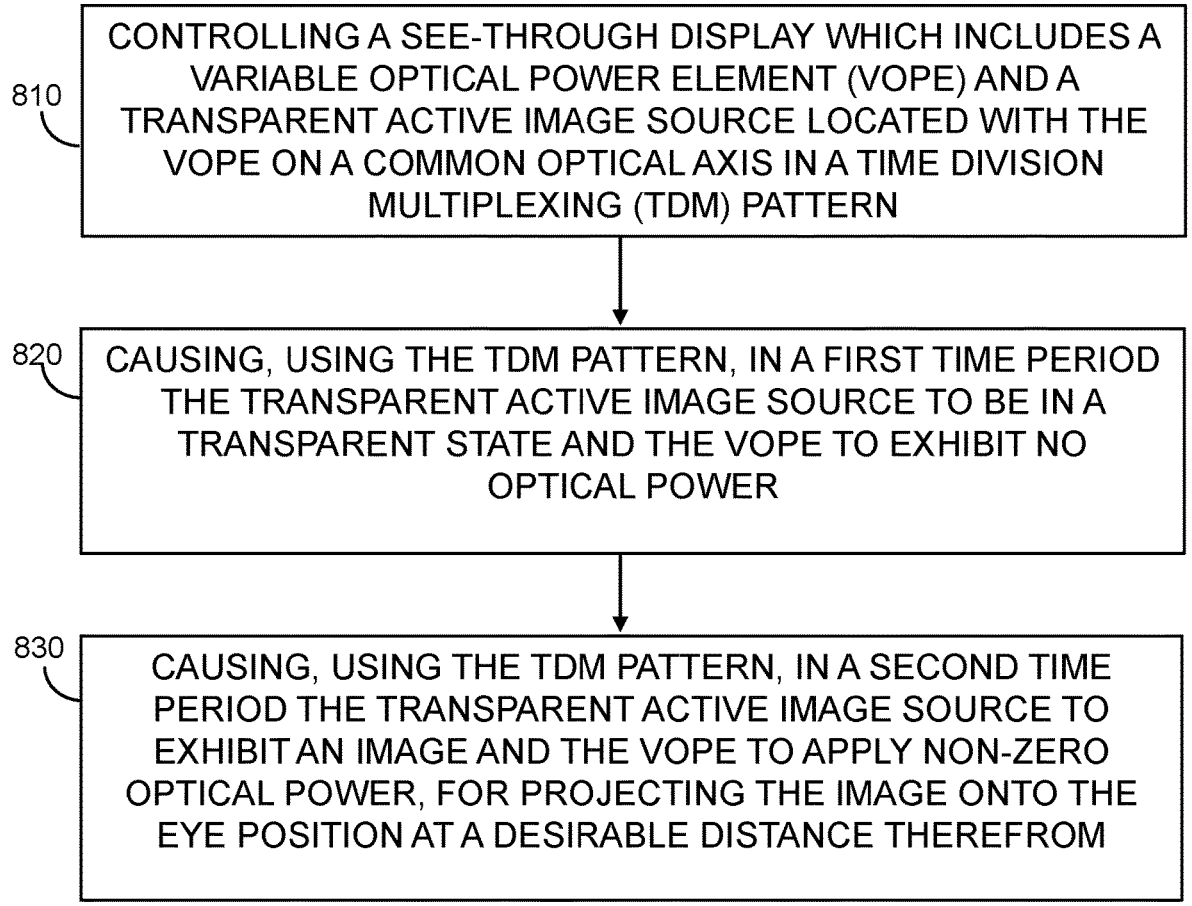
FIG. 8 is a high-level flowchart illustrating non-limiting exemplary method in accordance with embodiments of the present invention.

FIG. 8 is a high-level flowchart illustrating non-limiting exemplary method 800 in accordance with embodiments of the present invention. Some embodiments of the present invention provide a method for controlling a see-through display which includes a variable optical power lens (VOPE) and a transparent active image source located together with said VOPE on a common optical axis going from a scene to an eye position of a viewer. Method 800 may include the following steps: controlling said VOPE and said transparent active image source at a time division multiplexing (TDM) pattern 810; causing using the TDM pattern in a certain time period the transparent active image source to be in a transparent state and said VOPE to exhibit no optical power 820, and causing using the TDM pattern in another time period the said transparent active image source to exhibit an image and said VOPE to apply non-zero optical power, for projecting the image onto the eye position at a desirable distance therefrom 830. It is understood that TDM pattern is the scheduling plan for multiplexing as shown in the timing diagrams herein.

According to some embodiments of the present invention, the VOPE may be positioned closer to the eye position than said transparent active image source.

According to some embodiments of the present invention, the VOPE is located on a head mounted device and wherein said transparent active image source is located on a screen physically detached from said head mounted device.

According to some embodiments of the present invention, the VOPE is located on a head mounted device and wherein said transparent active image source is located on the same head mounted device.

According to some embodiments of the present invention, the transparent active image is within a head-up display (HUD).

According to some embodiments of the present invention, the STSD may further include an enhanced vision system (EVS), wherein the scene comprises a scene generated by said EVS.

According to some embodiments of the present invention, the STSD may further include night vision goggles (NVG), wherein said scene comprises a scene generated by said NVG.

According to some embodiments of the present invention, the VOPE may be adjustable to meet a momentarily gazing focus obtained by a head tracker.

According to some embodiments of the present invention, wherein the STDS may be configured to present to each eye of said viewer said image from the image source from a different angle.

According to some embodiments of the present invention, the STSD may further include a black foil mechanism located adjacent to said transparent active image source, facing the scene, configured to selectively block to the viewers parts of the scene when a pure synthetic image from said transparent active image source is presented to the viewers.

According to some embodiments of the present invention, the STSD may further include an illumination condition controller configured to selectively adjust the duty cycle of the TDM, responsive to illumination conditions.

According to some embodiments of the present invention, the VOPE may be configured to have two or more focal planes so as to present at least two objects from said image source in a different depth to said viewer.

According to some embodiments of the present invention, the TDM may be further operable in at least two frequencies and wherein said image source is further configured to provide a different image for each of the frequencies to enable two or more viewers presented with different images.

According to some embodiments of the present invention, the TDM may be further operable to exhibit a plurality of slot to present a different image on each of said slot.

According to some embodiments of the present invention, the transparent active image source may be operable with non-coherent light.

It should be noted that the method according to embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to control the TDM mechanism according to embodiments of the present invention, a computer processor may receive instructions and data from a read-only memory or a random-access memory or both. Additionally, at least one of aforementioned steps of the method in accordance with some embodiments of the present invention is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A see-through display system (STDS) configured to show synthetic images to viewer while still allowing the viewer to see through the STDS, comprising:
   a variable optical power element (VOPE), located on a head mounted display device;
   a transparent active image source located on a head-up display, HUD, physically detached from the head mounted device, wherein the transparent active image source lies on a common optical axis with said VOPE going from a scene to an eye position of the viewer, wherein said VOPE is positioned closer to the eye position than said transparent active image source; and
   a time division multiplexer (TDM) configured to control said VOPE and said transparent active image source,
   wherein said TDM is configured in a certain time period to cause said transparent active image source to be in a transparent state and said VOPE to exhibit no optical power,
   wherein said TDM is configured in another time period to cause said transparent active image source to produce a synthetic image and said VOPE to apply non-zero optical power, for projecting the synthetic image onto the eye position at a desirable distance therefrom,
   wherein said TDM alternates between said certain time period and said another time period; and
   an illumination condition controller configured to selectively adjust the duty cycle of the TDM responsive to illumination conditions such that a ratio between the certain time period and the another time period is varied to blend between the luminance of the scene versus the luminance of the synthetic images presented to the viewer.

2. The see-through display system according to claim 1, wherein said VOPE is positioned closer to the eye position than said transparent active image source.

3. The see-through display system according to claim 1, further comprising an enhanced vision system (EVS), wherein said scene comprises a scene generated by said EVS.

4. The see-through display system according to claim 1, further comprising night vision goggles (NVG), wherein said scene comprises a scene generated by said NVG.

5. The system according to claim 1, wherein the VOPE is adjustable to meet a momentarily gazing focus obtained by a head tracker.

6. The see-through display system according to claim 1, further configured to present to each eye of said viewer said image from the image source from a different angle.

7. The see-through display system according to claim 1, further comprising a black foil mechanism located adjacent to said transparent active image source, facing the scene, configured to selectively block to the viewers parts of the scene when a pure synthetic image from said transparent active image source is presented to the viewers.

8. The see-through display system according to claim 1, wherein said VOPE is configured to have two or more focal planes so as to present at least two objects from said image source in a different depth to said viewer.

9. The see-through display system according to claim 1, wherein said TDM is further operable in at least two frequencies and wherein said image source is further configured to provide a different image for each of said frequencies to enable two or more viewers presented with different images.

10. The see-through display system according to claim 1, wherein said TMD exhibits a plurality of slot to present a different image on each of said slot.

11. The see-through display system according to claim 1, wherein said transparent active image source is operable with non-coherent light.

12. A method for controlling a see-through display (STDS) configured to show synthetic images to a viewer while still allowing the viewer to see through the STDS, the STDS including:
- a variable optical power element (VOPE) located on a head mounted device and
- a transparent active image source located on a head-up display (HUD), physically detached from the head mounted device, wherein the transparent active image course lies on a common optical axis with said VOLE going from a scene to an eye position of a viewer, wherein the VOE is positioned closer to the eye position than said transparent active image source, the method comprising:

controlling said VOPE and said transparent active image source at a time division multiplexing (TDM) pattern, causing, using said TDM pattern, in a certain time period, the transparent active image source to be in a transparent state and said VOPE to exhibit no optical power, and causing, using said TDM pattern, in another time period, the said transparent active image source to generate an image along the optical axis going from a scene to an eye position of a viewer and causing said VOPE to apply non-zero optical power, for projecting the image onto the eye position at a desirable distance therefrom, wherein said TDM pattern alternates between said certain time period and said another time period, and wherein the method further comprises using an illumination controller to selectively adjust the duty cycle of the TDM pattern responsive to illumination conditions such that a ratio between the certain time period and the another time period is varied to blend between the luminance of the scene versus the luminance of the synthetic images presented to the viewer.

* * * * *